UNITED STATES PATENT OFFICE.

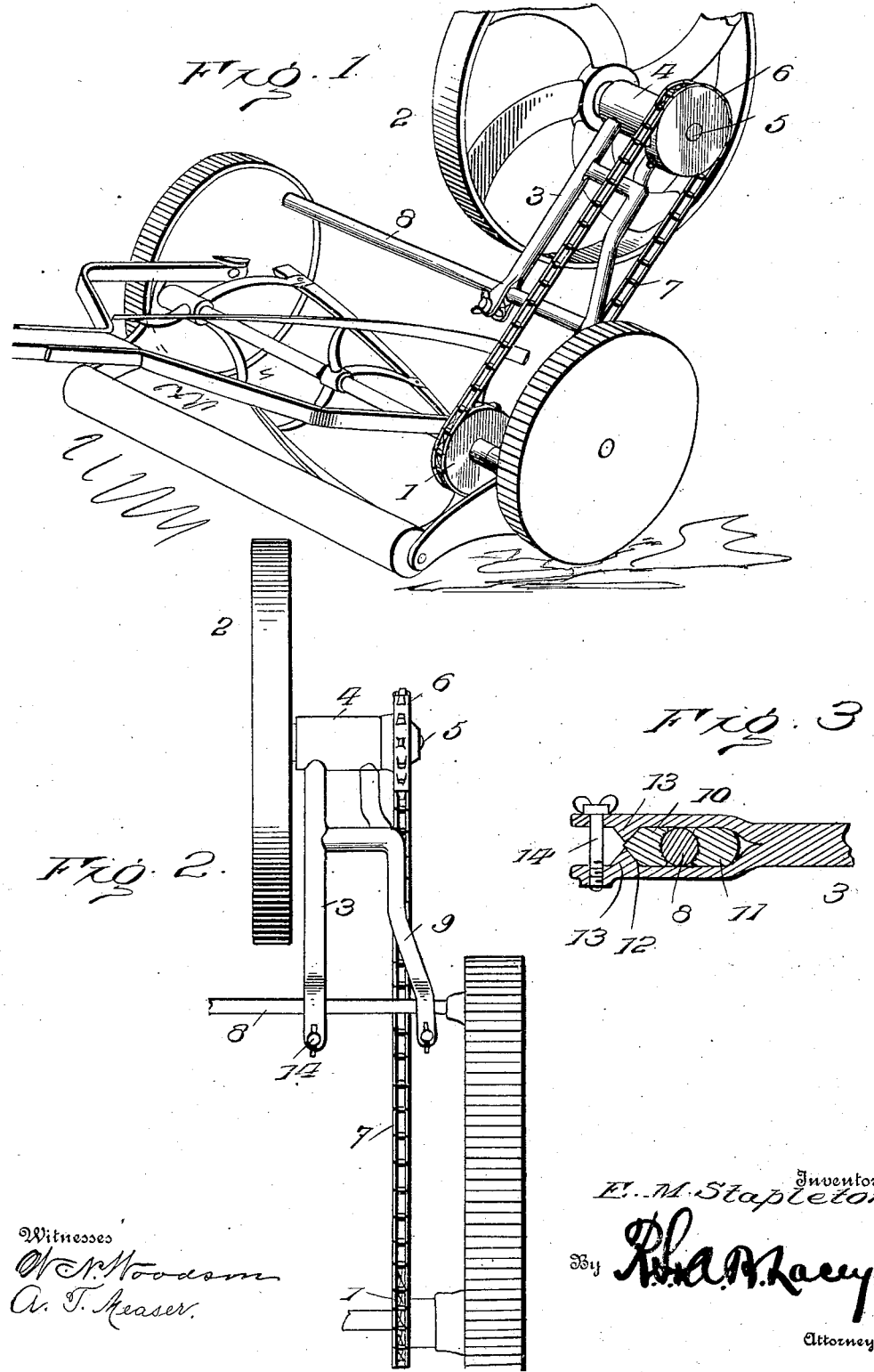

EARL M. STAPLETON, OF CEDAR VALE, KANSAS.

LAWN-MOWER.

No. 876,665.  Specification of Letters Patent.  Patented Jan. 14, 1908.

Application filed January 9, 1907. Serial No. 351,535.

*To all whom it may concern:*

Be it known that I, EARL M. STAPLETON, citizen of the United States, residing at Cedar Vale, in the county of Chautauqua and State of Kansas, have invented certain new and useful Improvements in Lawn-Mowers, of which the following is a specification.

In operating the accustomed lawn mower of the rotary type, it frequently becomes necessary to draw the machine backward a distance in order to obtain sufficient momentum of the working parts upon the forward stroke to insure proper cutting of a heavy tuft of grass, or other growth, which obstructs the free movement of the machine and makes necessary the backward movement in order to successfully continue the work.

This invention is designed to combine with a hand lawn mower of the rotary type, means for conserving power so as to insure the successful operation of the machine in a continued advance thereof over the lawn or grass covered surface to be mown.

The invention contemplates in combination with a lawn mower of the type aforesaid, a fly-wheel and novel mountings and actuating means therefor, said fly-wheel being of sufficient mass to conserve power which may be expended for the effective performance of work when tufts or knots of grass are met with, which under ordinary conditions would check the forward advance of the mower and render a backward movement thereof necessary in order to obtain sufficient momentum on the forward start to overcome the resistance of the obstructing work.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a hand lawn mower of the rotary type provided with a power conserving attachment embodying the invention. Fig. 2 is a detail view of the attachment. Fig. 3 is a sectional view showing the clamp for attaching the supporting frame to the transverse rod of the mower.

Corresponding and like parts are referred to in the following description and indicated in all the views of the drawings by the same reference characters.

The lawn mower shown in the accompanying drawings is of ordinary construction and comprises a rotary cutter and is illustrated to demonstrate the application of the invention.

A gear-wheel 1 is mounted upon an end portion of the shaft of the rotary cutter and suitable connections are provided for transmitting motion therefrom to the fly-wheel 2. A frame 3 is clipped, or otherwise fastened to the frame of the mower and inclines upwardly and forwardly and is provided at its upper end with a bearing 4 in which is mounted a shaft 5 to one end of which is secured the fly-wheel 2, a gear-wheel 6 being secured to the opposite end of said shaft and connected with the gear-wheel 1 preferably by means of a sprocket chain 7.

The gear-wheels 1 and 6 may be of like or different diameters according to the relative speed of the fly-wheel. By having the frame 3 upwardly inclined, the fly-wheel and gear-wheel 6 are elevated sufficiently above the surface to prevent entanglement of grass therewith in the operation of the machine. The fly-wheel is sufficiently heavy so that when driven in the operation of the machine, the momentum thereof will represent an amount of stored energy which may be effectively applied in driving the rotary cutter when meeting with more than usual resistance, thereby causing the machine to run comparatively steady and wholly obviating the necessity for drawing the machine backward in order to give the parts sufficient momentum and start upon the next forward movement to carry the mower past the obstruction. It is also observed that the momentum acquired by the fly-wheel causes the machine to run comparatively smooth and without shock and jar to the operator such as experienced in the operation of the usual hand lawn mower of the rotary type not equipped with an attachment such as herein disclosed.

The frame 3 comprises spaced members which are bifurcated, or forked at their lower ends to receive the transverse rod 8 of the lawn mower. The outer member of the frame is off-set as shown at 9 to throw its attaching end outward from the plane of the sprocket chain 7, thereby adding to the stability of the attachment and more uniformly distributing the strain upon the frame 3. Since the frame 3 is adapted to turn upon an axis different from that of the rotary cutter, it will be readily understood that angular adjustment of the frame 3 upon the rod 8 provides for varying the distance between the shaft 5 of the fly wheel and the shaft of the rotary cutter; hence any slack in the sprocket chain 7 may readily be taken up.

To prevent possible slipping of the frame upon the rod 8, gripper blocks 10 and 11 are fitted in the space formed between the bifurcations, or forked members of the side bars of the frame. The blocks 10 and 11 are preferably of steel and the ends adjacent to the rod 8 are made concave and toothed, or roughened, so as to bite into said rod and hold the frame against possible slipping. The outer end of the block 10 is oppositely inclined as shown at 12 and the inclined portions are engaged by the inclined faces of lugs 13 projected inward from the bifurcations of the side bars, or members of the frame. A set screw 14 serves to draw the bifurcations of each bar, or member, together and the inclined faces of the lugs 13 riding upon the inclined faces 12 of the block 10, press the latter inward by a wedging action with the result that the rod 8 is firmly gripped between the blocks 10 and 11. When the drive chain 7 becomes loose, the slack may be taken up by loosening the set screws 14 and turning the frame 3 upon the rod 8 to increase the distance between the shaft 5 and the shaft of the rotary cutter. After the frame has been properly adjusted, it is secured by retightening the set screws 14 as will be readily comprehended.

Having thus described the invention, what is claimed as new is:

1. The combination in a lawn mower of a rotary cutter shaft, a cross bar, a gear wheel applied to the rotary cutter shaft, a frame mounted upon the cross bar of the mower and carrying a bearing, a shaft journaled in the bearing, a fly wheel carried by the shaft, a gear wheel rigid with the shaft, and a chain connecting the two gear wheels, the said frame having a swinging movement upon the cross bar whereby compensation can be made for any slack in the chain.

2. The combination in a lawn mower of a rotary cutter shaft, a cross bar, a gear wheel applied to the rotary cutter shaft, a frame applied to the cross bar and comprising a member having one end thereof bifurcated to receive the cross bar of the lawn mower, the arms of the bifurcation carrying inwardly extending lugs formed with inclined faces, while the opposite end of the frame carries a bearing, a gripper block arranged between the arms of the said bifurcation, a set screw for drawing the arms together and causing the inclined faces of the lugs to engage the gripper block and force the same against the cross bar, a shaft journaled in the before mentioned bearing, a fly wheel carried by the shaft, a gear wheel rigid with the shaft, and a chain connecting the two gear wheels, the swinging movement of the frame upon the cross bar enabling compensation to be made for any slack in the chain.

3. The combination in a lawn mower of a rotary cutter shaft, a cross bar, a gear wheel applied to the rotary cutter shaft, a frame applied to the cross bar of the mower and comprising spaced members carrying a bearing at one end thereof while their opposite ends are bifurcated to receive the cross bar, the arms of the bifurcations carrying inwardly extending lugs formed with inclined faces, gripper blocks arranged between the said bifurcations and upon opposite sides of the said transverse bar, one of said gripper blocks having inclined faces for coöperation with the inclined faces of the lugs, set screws for drawing the bifurcations together, a shaft journaled in the bearing, a fly wheel carried by the shaft, a gear wheel rigid with the shaft, and a chain connecting the two gear wheels, the swinging movement of the frame upon the cross bar enabling compensation to be made for slack in the chain.

In testimony whereof I affix my signature in presence of two witnesses.

EARL M. STAPLETON. [L. S.]

Witnesses:
W. B. HENDRICKS,
NORA G. BROWN.